US008545606B2

(12) United States Patent
Koros et al.

(10) Patent No.: US 8,545,606 B2
(45) Date of Patent: Oct. 1, 2013

(54) TREATMENT OF MOLECULAR SIEVE PARTICLES FOR MIXED MATRIX MEMBRANES

(75) Inventors: William John Koros, Atlanta, GA (US); Jason Keith Ward, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 309 days.

(21) Appl. No.: 12/860,297

(22) Filed: Aug. 20, 2010

(65) Prior Publication Data

US 2012/0042780 A1 Feb. 23, 2012

(51) Int. Cl.
*B01D 53/22* (2006.01)
*B01D 71/64* (2006.01)
*B01D 71/02* (2006.01)

(52) U.S. Cl.
USPC ............................ 96/4; 96/14; 95/51; 524/450

(58) Field of Classification Search
USPC ......................... 96/4, 14; 95/45, 51; 524/450
See application file for complete search history.

(56) References Cited

U.S. PATENT DOCUMENTS

| | | | |
|---|---|---|---|
| 4,740,219 A | 4/1988 | Kulprathipanja et al. | |
| 6,508,860 B1 * | 1/2003 | Kulkarni et al. | 95/51 |
| 6,755,900 B2 * | 6/2004 | Koros et al. | 96/14 |
| 7,138,006 B2 | 11/2006 | Miller et al. | |
| 7,344,585 B1 * | 3/2008 | Kulprathipanja et al. | 96/4 |
| 7,588,699 B2 | 9/2009 | Park et al. | |
| 2008/0014451 A1 * | 1/2008 | Metz et al. | 524/450 |
| 2008/0295692 A1 * | 12/2008 | Liu et al. | 95/285 |
| 2010/0062156 A1 * | 3/2010 | Kurth et al. | 427/243 |
| 2010/0224555 A1 * | 9/2010 | Hoek et al. | 210/500.42 |

FOREIGN PATENT DOCUMENTS

EP 1873202 A1 1/2008

OTHER PUBLICATIONS

Mehtap Safak Boroglu et al. "Fabrication and characterization of silica modified polyimide-zeolite mixed matrix membranes for gas separation properties." Polymer Bulletin, vol. 66, No. 4, pp. 463-478, Springer-Verlag, Berlin, DE, May 2010.
International Search Report of corresponding counterpart international application No. PCT/US2011/048487 dated Nov. 30, 2011.
Hillock et al., "Cross-linkable polyimide membrane for natural gas purification and carbon dioxide plasticization reduction", 40(3) Macromolecules (2007), pp. 583-587.
Omole, "Crosslinked polyimide hollow fiber membranes for aggressive natural gas feed streams",, Thesis for School of Chem & Biomol. Eng. (2008), Georgia Inst Technology.
O'Brien et al., "A new technique for the measurement of multicomponent gas-transport . . . ", 29(3) J. Membrane Sci. (1986), pp. 229-238.
Pye et al.,"Measurement of gas permeability of polymers. I. Permeabilities in constant volume-variable . . . ", 20(7) J. Appl. Polymer Sci. (1976), pp. 1921-1931.
Kamaruddin et al., "Some observations about the application of frick's first law for membrane science . . . ", 135(2) J. Membrane Sci. (1997), pp. 147-159.

(Continued)

*Primary Examiner* — Jason M Greene

(57) ABSTRACT

The present invention relates to a method for treating molecular sieve particles for use in a mixed matrix membrane useful in, for example, gas separations. Membranes employing treated molecular sieve particles may exhibit enhanced permeabilities and selectivities in regard to, for example, the separation of carbon dioxide and methane.

19 Claims, 4 Drawing Sheets

(56) References Cited

OTHER PUBLICATIONS

Koros et al.,"A model for permeation of mixed gases and vapors in glassy-polymers", 19 J. Polymer Sci.: Part B—Polymer Physics (1981), pp. 1513-1530.

Moore et al., "Non-ideal effects in organic-inorganic materials for gas separation membranes". 739 J. Molecular Struc. (2005), pp. 87-98.

Merkel et al., "Ultrapermeable, reverse-selective nanocomposite membranes", 296 Science (2002), pp. 519-522.

Priestly et al., "Evidence for the molecular-scale origin of the suppression of physical ageing in confined polymer . . . ", 19 J. Phys. Condens. Matter (2007), pp. 1-12.

Priestly et al., "Structural relaxation of polymer glasses at surfaces, interfaces, and in between", 309 Science (2005), pp. 456-459.

Mahajan et al., "Mixed matrix membrane materials with glassy polymers. Part 1.", 42(7) Polymer Eng. & Sci., (2002), pp. 1420-1431.

Duval et al., "Preparation of zeolite filled glassy polymer membranes", 54(4) J. Appl. Polymer Sci., (1994), pp. 409-418.

Baker et al., "Natural Gas Processing with Membranes: An Overview", 47 Ind. Eng. Chem. Res. (2008), pp. 2109-2121.

Bernardo et al., "Membrane Gas Separation: A Review / State of the Art", 48 Ind. Eng. Chem. Res. (2009), pp. 4638-4663.

International Energy Outlook, Energy Information Administration, DOE (May 2009).

Bos et al., "CO2-induced plasticization phenomena in glassy polymers", 155 J. Membrane Sci. (1999), pp. 67-78.

Hillcock et al., "Cross-Linkable Polyimide Membrane for Natural Gas Purification . . . ", 40 Macromolecules (2007), pp. 583-587.

Koros et al., "Polymeric Membrane Materials for Solution-Diffusion Based Permeation Separations", 13 Prog. Polym. Sci. (1988), pp. 339-401.

Omole et al., "Increased Molecular Weight of a Cross-Linkable Polyimide for Spinning Plasticization . . . ", 41 Macromolecules (2008), pp. 6367-6375.

Staudt-Bickel et al., "Improvement of CO2/CH4 separation characterisitics of polyimides by chemical crosslinking", 155 J. Membrane Sci. (1999), pp. 145-154.

Wind et al., "The Effects of Crosslinking Chemistry on CO2 Plasticization of Polyimide Gas Separation Membranes", 41 Ind. Eng. Chem. Res. (2002), pp. 6139-6148.

Wind et al., "Solid-State Covalent Cross-Linking of Polyimide Membranes for Carbon Dioxide Plasticization Reduction", 36 Macromolecules (2003), pp. 1882-1888.

Mahajan et al., "Mixed Matrix Membrane Materials with Glassy Polymers. Part 2", 42(7) Polym. Eng. & Sci. (Jul. 2002), pp. 1432-1441.

Shu et al., "A General Strategy for Adhesion Enhancement in Polymeric Composites . . . ", 111 J. Phys. Chem. C (2007), pp. 652-657.

Suer et al., "Gas permeation characteristics of polymer-zeolite mixed matrix membranes", 91 J. Membrane Sci. (1994), pp. 77-86.

Vu et al., "Mixed matrix membranes using carbon molecular sieves . . . ", 211 J. Membrane Sci. (2003), pp. 311-334.

Hillcock et al., "Crosslinked mixed matrix membranes for the purification of natural gas . . . ", 314 J. Membrane Sci. (2008), pp. 193-199.

Vankelecom et al., "Silylation to Improve Incorporation of Zeolites in Polyimide Films", 100 J. Phys. Chem. (1996), pp. 3753-3758.

Bae et al., "Facile High-Yield Solvothermal Deposition of Inorganic Nanostructures on Zeolite Crystals . . . ", 131 J. Am. Chem. Soc. (2009), pp. 14662-14663.

Robeson et al., "Physical Property Characteristics of Polysulfone / Poly(Dimethylsiloxane) Block Polymers", 29/30 Die Angelwandte Makromolekulare Chem. (1973), pp. 47-62.

Merkel et al., "Ultrapermeable, Reverse-Selective Nanocomposite Membranes", 296 Science (2002), p. 519.

Priestley et al., "Evidence for the molecular-scale origin of the suppression of physical ageing in confined polymer . . . ", 19 J. Phys. Condens. Matter (2007), pp. 1-12.

Jordan et al., "The Effects of CO2 Exposure on Pure and Mixed Gas Permeation Behavior . . . ", 30 J. Membrane Sci. (1987), pp. 191-212.

Kim et al., "Effects of CO2 exposure and physical aging on the gas permeability of thin 6FDA-based polyimide membranes . . . ", 282 J. Membrane Sci. (2006), pp. 32-43.

Kim et al., "Physical aging of thin 6FDA-based polyimide membranes containing carboxyl acid groups . . . ", 47 Polymer (2006), pp. 3094-3103.

Moe et al., "Effects of Film History on Gas Transport in a Fluorinated Aromatic Polyimide", 36 J. Appl. Polym. Sci. (1988), pp. 1833-1846.

Moe et al., "Effects of Molecular Structure and Thermal Annealing on Gas Transport in Two Tetramethyl Bisphenol-A Polymers", 26 J. Polym. Sci., Part B: Polymer Physics (1988), pp. 1931-1945.

Pfromm et al., "Accelerated physical ageing of thin glassy polymer films: evidence from gas transport measurements", 36 (12) Polymer (1995), pp. 2379-2387.

Pope et al., "Effect of Various Exposure Histories on Sorption and Dilation in a Family of Polycarbonates", 23 Macromolecules (1990), pp. 2988-2994.

Hillock, "Crosslinkable Polyimide Mixed Matrix Membranes for Natural Gas Purification", Thesis, Georgia Institute of Technology (2005), p. 205.

Shu, "Engineering the Performance of Mixed Matrix Membranes for gas Separations", Thesis, Georgia Institute of Technology (2007).

Robeson, "The upper bound revisited", 320(12) J. Membrane Sci. (2008), pp. 390-400.

\* cited by examiner

TREATMENT OF MOLECULAR SIEVE PARTICLES FOR MIXED MATRIX MEMBRANES

FIELD OF THE INVENTION

This invention relates to treatment of molecular sieve particles for mixed matrix membranes useful for, for example, gas separations.

BACKGROUND AND SUMMARY OF THE INVENTION

Mixed matrix membranes (MMMs) are gas separation membranes that attempt to integrate the outstanding separation properties of molecular sieves (zeolites, carbon molecular sieves, etc.) with the cost and processing advantages of polymers. Ideally, MMMs would provide a solution to the permeability/selectivity tradeoff observed for polymer membranes and expand the market for membrane separations versus more traditional absorption- and adsorption-based operations. Such improvement in membrane performance could prove especially beneficial in high-volume gas separation areas such as natural gas processing.

Natural gas processing currently represents the largest market for industrial gas separations; this is likely to remain true as global natural gas consumption increases towards an estimated 150 trillion standard cubic feet annually by 2030. Virtually all natural gas requires some degree of processing prior to transport via pipeline or tanker. For example, a common contaminant found in gas wells—carbon dioxide—often must be substantially removed to prevent pipeline and equipment corrosion and line blockage due to solid carbon dioxide accumulation. The removal of carbon dioxide from natural gas streams, however, may be especially troublesome for polymer membranes due to, for example, the strong plasticization response of most commercially applicable polymers. This phenomenon may result in deleterious membrane performance loss.

Crosslinking may stabilize some polymer membranes against plasticization to some degree and assist in maintaining membrane performance under aggressive feed conditions. However, crosslinked polymer membrane separation performance may be limited by the permeability/selectivity tradeoff. Also, MMMs utilizing crosslinkable polymer matrices are more beneficial if they exhibit adequate adhesion at the polymer/sieve interface. This assists in reducing non-ideal interfacial morphologies commonly referred to as sieve-in-a-cage and leaky interface defects. Such a reduction would increase polymer/sieve compatibility and foster MMMs goal of enhancing permeability and selectivity.

A number of methods aimed at improving polymer/sieve adhesion have been attempted. For example, thermal annealing did not achieve complete elimination of interfacial voids and also sometimes resulted in thermal degradation. Silane coupling agents may result in little to no improvement in transport properties for certain materials, as well, some gas leakage at the interface. And unfortunately modifying the surface of zeolite A by roughening the surfaces of modified sieves with nanoscale deposits of magnesium hydroxide is complex and may not be highly effective with, for example, high-silica molecular sieves.

Thus, what is needed is a way of overcoming the aforementioned limitations and improving the performance of crosslinkable MMMs in, for example, gas processing. It would further be beneficial if such a procedure and MMM did not require, for example, silane coupling agents or inorganic nanoscale surface deposits. The procedure and MMM would be further beneficial if it enhanced the MMM's permeability, selectivity, and/or if the crosslinked membranes were stable even under highly-plasticizing feed conditions as compared to prior art MMMs.

Advantageously, this invention overcomes many of the limitations of the prior art and has additional advantages. In one embodiment, the invention relates to a method for treating molecular sieve particles for use in a mixed matrix membrane. The mixed matrix membrane comprises the treated molecular sieve particles dispersed in a crosslinked polymer continuous phase. The method comprises: (a) selecting suitable molecular sieve particles; and then (b) polymerizing a polymer which is compatible with the polymer to be employed in the mixed matrix membrane in the presence of the molecular sieve particles to obtain treated molecular sieve particles.

In another embodiment, the invention pertains to a mixed matrix membrane for separating carbon dioxide and methane. The membrane comprises (1) a crosslinked polymer continuous phase; and (2) treated molecular sieve particles dispersed in said continuous phase. The membrane is characterized by having a carbon dioxide/methane ideal selectivity of at least about 5% higher at 65 psia and 35° C. than a comparable membrane with untreated molecular sieve particles.

DETAILED DESCRIPTION OF THE INVENTION

Figure 1:
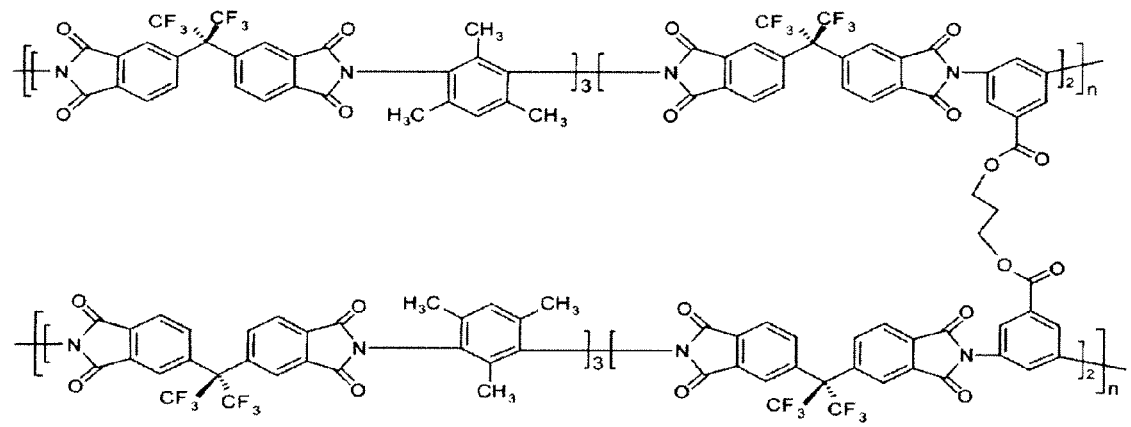
FIG. 1 shows a structure of a crosslinked PDMC repeat unit.

In some respects the present invention expands upon the inventions of U.S. Pat. No. 6,755,900. Accordingly, U.S. Pat. No. 6,755,900 is incorporated herein in its entirety and for all purposes to the extent that it is not inconsistent with this application.

In one respect, the present invention relates to a method for treating molecular sieve particles for use in a mixed matrix membrane. Useful mixed matrix membranes comprise, for example, the treated molecular sieve particles dispersed in a crosslinked polymer continuous phase. The method of treating the particles comprises first selecting suitable molecular sieve particles for the desired mixed matrix membrane. Useful molecular sieve particles are described in detail in U.S. Pat. No. 6,755,900.

If necessary, the selected molecular sieve particles may be dried. The manner of drying is not particularly critical and may be done in any suitable manner known in the art so long as the method does not introduce any undesired crosslinking. The manner selected may vary depending upon the specific molecular sieve particles to be employed and the specific type of membrane in which the particles will be employed. Such drying may simply include heating the particles under vacuum at a temperature above about 75° C. for at least about 8 hours.

After the optional drying step, a polymer which is compatible with the polymer to be employed in the mixed matrix membrane is polymerized in the presence of the molecular sieve particles to obtain treated molecular sieve particles. If necessary or desired, the treated molecular sieve particles may be washed before employing them in a MMM. The washing may assist in removing extraneous, unattached material from the treated sieves which may not have physical properties as desirable as the polymer used in the continuous phase of a MMM. The washing may be accomplished in any convenient manner so long as it does not have a deleterious effect upon the treated sieve particles for use in a MMM The treated molecular sieve particles are useful in making a MMM with improved selectivity and/or permeability as compared to a comparable MMM with untreated molecular sieve particles.

Useful polymers and molecular sieve particles are described in detail in U.S. Pat. No. 6,755,900. In some embodiments, the polymer which is compatible with the polymer to be employed in the mixed matrix membrane may be a nearly identical polymer as in the continuous phase of the mixed matrix membrane. By "compatible", it is meant that by employing treated particles in the formed membrane, the membrane will exhibit enhanced selectivity, permeability or both over a comparable membrane having untreated particles when separating the same gas composition. Of course, the degree of enhanced selectivity, permeability or both will vary depending upon the ingredients and amounts of the formed membrane, as well as, on the composition of the gases being separated. By way of example, the specific enhanced selectivity of an MMM for separating carbon dioxide and methane is described below. In some embodiments, compatible treatment polymers are miscible with the polymer to be employed in the mixed matrix membrane. In a preferred embodiment, the compatible treatment polymer is comprised of the same monomers as the continuous phase of the mixed matrix membrane. Thus, as described in U.S. Pat. No. 6,755,900, useful polymers for the continuous phase of the mixed matrix membrane and/or for the compatible polymer may include, but are not necessarily limited to, substituted or unsubstituted polysulfones, poly(styrenes), styrene-butadiene copolymers, styrene-vinylbenzylhalide copolymers, polycarbonates, cellulosic polymers, polyamides, polyimides, polyethers, polyetherimides, polyetherketones, polyethersulfones, poly (arylene oxides), poly(esteramide-diisocyanate), polyurethanes, polyesters, poly(alkyl methacrylates), poly (acrylates), poly(phenylene terephthalate), polypyrrolones, polysulfides, poly(ethylene), poly(propylene), poly(butene-1), poly(4-methyl pentene-1), polyvinyls, polyallyls, poly (benzobenzimidazole), polyhydrazides, polyoxadiazoles, polytriazoles, poly(benzimidazole), polycarbodiimides, polyphosphazines. A particularly preferred polymer is a polyimide such as PDMC.

Similarly, as described in U.S. Pat. No. 6,755,900, useful molecular sieve particles include, but are not necessarily limited to, one or more selected from the group consisting of ABW, AEI, AFT, AFX, APC, APD, ATN, ATT, ATV, AWW, BIK, BRE, CAS, CHA, DDR, EAB, EDI, ERI, GIS, GOO, ITE, JBW, KFI, LEV, LTA, MER, MON, NAT, PAU, PHI, RHO, RTE, RTH, THO, VNI, YUG, ZON, Linde Type A, Chabazite, Erionite, SAPO-56, AEL, AFO, AHT, CGF, DAC, EPI, EUO, FER, HEU, LAU, MEL, MFI, MFS, MTT, NES, PAR, SFF, STF, STI, TER, TON, WEI, WEN, ZSM-5, ZSM-11, ZSM-22, ZSM-23, ZSM-35, ZSM-48, ZSM-57, SUZ-4, SSZ-13, SSZ-23, SSZ-25, SSZ-28, SSZ-32, SSZ-36, NU-87, silicalite, AFI, AFR, AFS, AFY, ATO, ATS, BEA, BOG, BPH, CAN, CON, CZP, DFO, EMT, FAU, GME, LTL, MAZ, MEI, MOR, MTW, OFF, OSI, RON, SAO, VET, Linde Type L, Beta zeolite, CIT-1, Faujasite, Mazzite, Mordenite, ZSM-12, Offretite, CLO, VFI, AET, CFI, Cloverite, CTI-5 and mixtures thereof. Many of the aforementioned molecular sieve structure types are identified by their structure type code as assigned by the IZA Structure Commission following the rules set up by the IUPAC Commission on Zeolite Nomenclature wherein each unique framework topology is designated by a structure type code consisting of three capital letters.

Particularly preferred molecular sieve particles include those having one or more of the following characteristics: comprised of microporous aluminosilicate, having a chabazite framework, having a silica to alumina molar ratio of greater than about 25 as measured by inductively coupled plasma bulk chemical analysis, and/or particles having an average particle size of from about 100 to about 700 nm, or from about 300 to about 600 nm, or from about 450 to about 550 nm as measured by the methods described in U.S. Pat. No. 7,138,006 at column 6, line 61 to column 7, line 27. U.S. Pat. No. 7,138,006 is incorporated herein in its entirety and for all purposes to the extent that it is not inconsistent with this application.

Once the molecular sieve particles have been treated as described above, they may be employed to make a MMM as described in, for example, U.S. Pat. No. 6,755,900. In a particularly preferred embodiment a MMM for separating carbon dioxide and methane may be made. The MMM comprises (1) a crosslinked polymer continuous phase and (2) treated molecular sieve particles dispersed in said continuous phase. The membrane is characterized by having a carbon dioxide/methane ideal selectivity ($\alpha CO_2/CH_4$) of at least about 5%, or at least about 6%, or at least about 7%, or at least about 8%, or at least about 9, or at least about 10% or more higher at 65 psia and 35° C. than a comparable membrane with untreated molecular sieve particles using pure gases as described in the test associated with Table 2 below. Similarly, using the same test method, carbon dioxide permeability of a MMM comprising treated molecular sieve materials may be enhanced by at least about 1, or least about 2, or at least about 3% or more higher than a comparable membrane with untreated molecular sieve particles using pure gases as described in the test associated with Table 2 below.

In another embodiment the MMM for separating carbon dioxide and methane comprising polymer and treated molecular sieve materials may be characterized as having a carbon dioxide permeability enhancement of at least about 35%, or at least about 40%, or at least about 45% over the neat polymer employed as the continuous phase of the MMM when tested with 10% $CO_2$/90% $CH_4$ at 35° C. at 700 psia as in the test associated with FIG. 4 below. Similarly, using the same test method carbon dioxide/methane selectivity may be enhanced at least about 4%, or at least about 7%, or at least about 11% over the neat polymer employed as the continuous phase of the MMM.

As described previously, the treated molecular sieve particles may be treated by a method which comprises selecting the molecular sieve particles and then polymerizing a compatible polymer in the presence of the molecular sieve particles to obtain treated molecular sieve particles.

The surprising and unexpected transport properties of the membranes reported here will greatly assist in using crosslinked mixed matrix membranes for challenging gas separations. It is believed that even greater selectivity enhancements may be realized by exposing these membranes to strongly sorbing materials or PDMC-like oligomers that would reduce free volume of dilated interphase.

The present invention will be better understood with reference to the following non-limiting examples. Other embodiments, uses, and advantages of the invention will be apparent to those skilled in the art from consideration of this specification and practice of the invention disclosed herein. This specification should be considered exemplary only and the scope of the invention is accordingly intended to be limited only by the claims.

EXAMPLES

The present examples are intended to help illustrate the process of the present invention and are not meant to limit the scope of the application.

A crosslinkable polyimide—6FDA-DAM:DABA (3:2), esterified with 1,3-propanediol—was used in this work. The synthesis and crosslinking mechanism of this polymer has been described in detail in, for example, Hillock, A. M. W. and W. J. Koros, Cross-linkable polyimide membrane for natural gas purification and carbon dioxide plasticization reduction. Macromolecules, 2007. 40(3): p. 583-587 and Omole, I. C., *Crosslinked polyimide hollow fiber membranes for aggressive natural gas feed streams*, in pH.D. Thesis for School of Chemical and Biomolecular Engineering. 2008, Georgia Institute of Technology: Atlanta, Ga. Commonly referred to as PDMC (PropaneDiol Monoester Crosslinkable), this polymer is synthesized from 4,4'-(hexafluoroisopropylidene)diphthalic anhydride (6FDA); 2,4,6-trimethyl-m-phenylenediamine (DAM); and 3,5-diaminobenzoic acid (DABA). The carboxylic acid moieties on the DABA groups are esterified with 1,3-propanediol, yielding a polymer that is crosslinkable via transesterification at elevated temperatures. The PDMC samples used had average molecular weights between 90,000 and 148,000 g/mol. For reference, a crosslinked PDMC repeat unit is shown in FIG. 1.

The molecular sieve used in this work was SSZ-13—a microporous aluminosilicate having a chabazite framework and a pore diameter of 3.8 Å. The sieves used had an average particle size of ~500 nm and a silica to alumina molar ratio >25. The relatively high silica content of the SSZ-13 used resulted in more hydrophobic sieves that were less prone to pore blockage due to water adsorption. Such hydrophobic sieves may lead to reduced feed pretreatment requirements.

The reactive sizing procedure used to treat SSZ-13 is as follows: 1 g of sieves was added to a 100 ml round bottom flask and subsequently dried under vacuum at 150° C. Maintaining anhydrous conditions, sufficient NMP (anhydrous) was added to the flask to yield a 3-4% (w/v) mixture. A dry nitrogen purge was started, and the sieves were dispersed using an ultrasonication bath. The flask was removed to a stir plate and 0.98 g DAM and 0.66 g DABA were added. After stirring for 15 min, 4.81 g 6FDA were added. The mixture was then stirred 12 hr at room temperature to form a sieve/polyamic acid (PAA) dispersion.

Approximately 1.1 ml 3-methylpyridine and 9.6 ml acetic anhydride were subsequently added to the dispersion. The mixture was stirred for an additional 12 hr.

The mixture was then precipitated in methanol and washed before collection via a high pressure filter unit using a 0.2 μm filter disc. The collected solids were partially dried in a fume hood for several hours before being fully dried under vacuum at 200° C. for 8 hr.

The dried solids were placed in a 100 ml round bottom flask, and a dry nitrogen purge was started. Sufficient NMP (anhydrous) was added to the dry solids to form a 20% (w/w) mixture. Once the mixture appeared homogeneous, the temperature was increased to 100° C. and 21.8 ml 1,3-propanediol was slowly added along with 2.8 mg p-toluenesulfonic acid. The temperature was then increased to 140° C. and maintained for 12 hr.

The mixture was again precipitated and washed in methanol before collection via high pressure filtration. The collected solids were dried in a hood for several hours before being dried under vacuum at 75° C. for 48 hr. Reactively sized sieves were then recovered by washing the dry solids with THF; treated sieves were subsequently dried under vacuum at 75° C. before use.

Mixed matrix membranes were prepared by a solution casting method. To prepare the casting solution, or dope, approximately 250 mg of sieves were dried in a clean glass vial under vacuum at 150° C. for at least 8 hr. Reactively sized sieves were dried at 75° C. to avoid overheating and prematurely crosslinking any PDMC or PDMC-like material that may have been present at, for example, the sieve surface.

Sufficient THF (anhydrous) was added to the vial to form a 3-5% (w/w) mixture. The sieves were subsequently dispersed using an ultrasonication horn. It was observed that reactively sized SSZ-13 dispersed more easily than as-received sieves.

A small amount of dry PDMC (~1% of the total) was added to the mixture to stabilize, or prime, the dispersion. The vial was vigorously shaken to dissolve the PDMC, and the mixture was again dispersed using an ultrasonication horn. Dry PDMC was added to the dispersion in small batches (~10% of the total) followed by vigorous shaking until the polymer had dissolved. Polymer was added until the desired sieve/polymer loading was reached. The vial was then placed on an axial roller for 24 hr to thoroughly mix.

Dilute MMM dopes were prepared to facilitate sieve dispersion and mixing. Prior to casting, dopes were concentrated to 25-30 wt % solids by slowly purging the vial with dry nitrogen. Concentrated dopes were mixed on an axial roller until ready for casting.

Membranes were cast on a tempered glass plate using a 10 mil stainless steel draw knife. The casting environment was controlled using a polyethylene glove bag filled with dry nitrogen saturated with THF. The nascent membranes were covered by an inverted glass dish to further slow solvent evaporation.

Membranes were allowed to vitrify for at least 24 hr before being removed from the glove bag. Membranes were delaminated from the glass plate and dried in a room temperature vacuum oven for one hour before being slowly ramped to 75° C. The oven temperature was then increased to 220° C. for 24 hr to crosslink the membrane. Membranes were allowed to slowly cool to room temperature prior to removal and preparation for testing.

Neat PDMC membranes, containing no SSZ-13, were prepared similarly, excluding sieve dispersion steps.

Thermogravimetric Analysis and X-Ray Photoelectron Spectroscopy of Sieves and Membranes As-received and reactively sized sieves were analyzed with thermogravimetric analysis (TGA) and X-ray photoelectron spectroscopy (XPS). TGA analyses were performed using a Netzsch STA 409 PC Luxx thermogravimetric analyzer to determine the amount of surface-bound material resulting from the reactive sizing procedure. XPS analyses were performed using a Surface Science Labs SSX-100 spectrometer emitting monochromatic Al Kα X-rays to determine the composition of material deposited during the reactive sizing procedure.

Mixed matrix membranes were characterized via scanning electron microscopy (SEM) and gas permeation testing. Membrane cross-sections for SEM imaging were prepared by cryogenically fracturing thin strips of membranes under liquid nitrogen. Samples were sputter coated with a thin layer of gold (~10 nm) to reduce charging during imaging. Micrographs were acquired on a LEO 1530 thermally-assisted field emission SEM using an accelerating voltage of 15 kV.

Permeation testing was performed using an isochoric (constant volume) technique as described in, for example, O'brien, K. C., et al., A new technique for the measurement of multicomponent gas-transport through polymeric films. Journal of Membrane Science, 1986. 29(3): p. 229-238 and Pye, D. G., H. H. Hoehn, and M. Panar, *Measurement of gas permeability of polymers. 1. Permeabilities in constant volume-variable pressure apparatus*. Journal of Applied Polymer Science, 1976. 20(7): p. 1921-1931. Generally, the method involves: masking a section of membrane, affixing the masked membrane to a permeation cell, and then sealing the cell within the permeation apparatus. All analyses were conducted at 35° C. Masked membranes were evacuated for 48-72 hr prior to permeation testing in order to degas the membrane and masking materials. Measured degas, or leak, rates were typically <0.5% of the steady state methane permeation rate. Leak-adjusted steady state fluxes were taken between 10 and 14 time lags to ensure steady state permeation had been achieved. Pure gas testing was performed using carbon dioxide and methane (research grade) at ~65 psia. Mixed gas testing was performed using a 10% carbon dioxide/90% methane mixture at pressures up to 700 psia. The permeation apparatus was modified for mixed gas testing such that feed and permeate streams were analyzed using a gas chromatograph (GC) (Agilent 6890N) configured with a capillary column and thermal conductivity detector.

Treated SSZ-13

Figure 2:
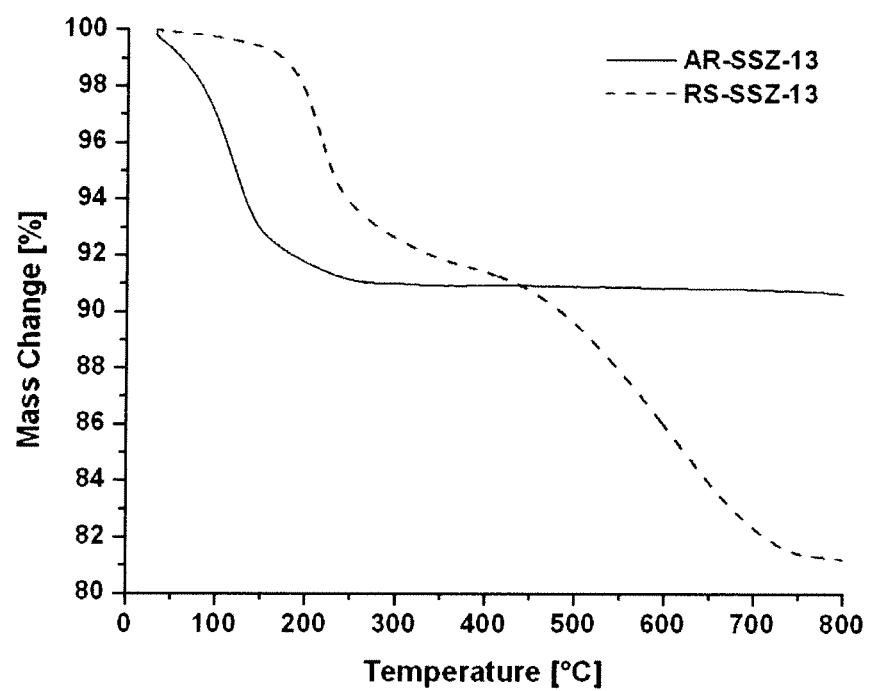
FIG. 2 shows TGA analyses of as-received (AR) and reactively sized (RS) SSZ-13.

Comparing the thermogravimetric analysis of treated, i.e., reactively sized, (RS) SSZ-13 to that of as-received (AR) sieves suggests that significant material remains on RS-SSZ-13 even after rigorous washing (i.e., 15 min of dispersion in THF via ultrasonication bath, repeated 10 times). The TGA results in FIG. 2 show that over 9% of the mass lost by RS-SSZ-13 can be attributed to the material deposited during the reactive sizing procedure. It is unlikely that any materials used during this procedure could enter the 3.8 Å pores of SSZ-13, so it is presumed that any deposited material exists on the outer sieve surface. Surface-bound material is likely to be hydrogen bonded or covalently bonded with external silanol groups.

The elemental composition of surface-bound material was probed using XPS analysis. Compositions for AR- and RS-SSZ-13 are compared in Table 1.

TABLE 1

Elemental surface compositions of as-received (AR) and reactively sized (RS) SSZ-13 as measured by XPS.

| | Atomic % | | | | | | |
|---|---|---|---|---|---|---|---|
| Sample | Si | Al | O | C | N | F | Total |
| AR-SSZ-13 | 27.6 | 2.3 | 68.5 | 1.6 | — | — | 100 |
| RS-SSZ-13 | 23.7 | 1.3 | 48.2 | 22.5 | 1.2 | 3.0 | 99.9 |

SSZ-13/PDMC Mixed Matrix Membranes

Scanning electron micrographs of AR-SSZ-13/PDMC MMM cross-sections show excellent sieve dispersion and polymer/sieve adhesion. A representative micrograph is given in FIG. 3. Cross-sections of RS-SSZ-13/PDMC MMMs appear very similar to FIG. 3.

Permeation testing with pure carbon dioxide and methane was performed on neat PDMC, 25 wt % AR-SSZ-13/PDMC, and 25 wt % RS-SSZ-13/PDMC membranes. The results of these analyses are summarized in Table 2.

TABLE 2

Pure gas permeation results for neat PDMC and 25 wt % as-received and reactively sized SSZ-13/PDMC MMMs.

| Membrane | $P_{CO2}$ | $\alpha_{CO2/CH4}$ |
|---|---|---|
| Neat PDMC | 66.9 ± 4.1 | 36.4 ± 0.6 |
| 25% AR-SSZ-13/PDMC | 153 ± 33 | 34.7 ± 0.8 |
| 25% RS-SSZ-13/PDMC | 148 ± 17 | 38.9 ± 2.0 |

Permeabilities are given in units of Barrers.
Membranes were tested at 35° C. and ~65 psia.
Errors are ± one standard deviation.

Carbon dioxide permeabilities were enhanced 129% and 121% over neat PDMC for AR-and RS-SSZ-13/PDMC membranes, respectively. Ideal carbon dioxide/methane selectivities, however, show opposing trends for membranes containing AR- and RS-SSZ-13. AR-SSZ13/PDMC membranes averaged a 4.7% decrease over neat PDMC while RS-SSZ-13/PDMC membranes averaged a 6.9% increase—in other words, a differential of over 11% in favor of the RS-SSZ-13.

Figure 3:
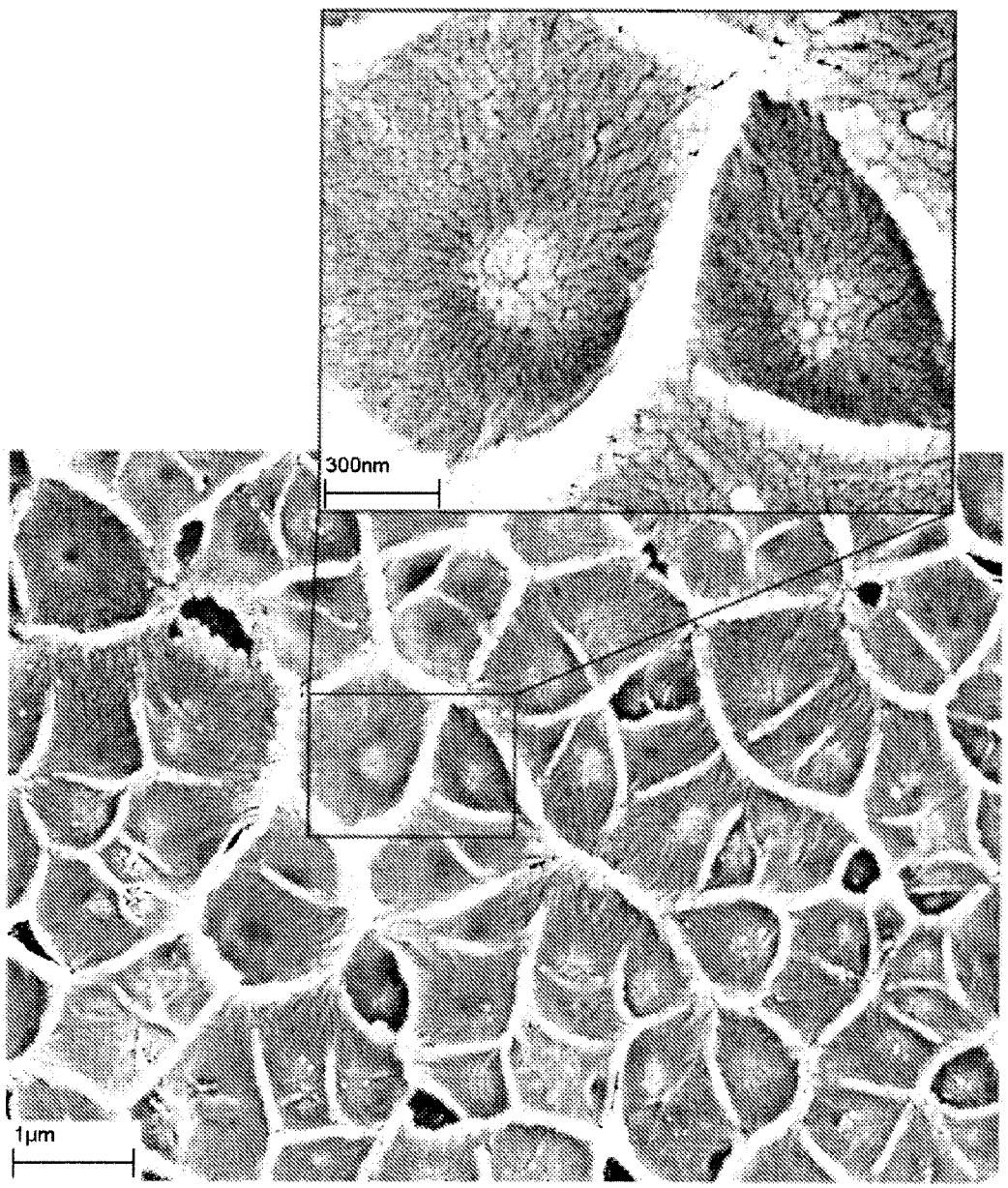
FIG. 3 shows a representative SEM micrograph of SSZ-13/PDMC MMM cross-section.

Large permeability enhancements in MMMs may be due to sieve-in-a-cage (SIAC) defects. The presence of these defects, however, is typically supported by direct visual observation and/or measured selectivities equal to those of the pure polymer membranes. In the present case, SEM micrographs, such as given in FIG. 3, show the absence of interfacial voids characteristic of SIAC defects. Moreover, ideal selectivities were observed to either increase or decrease versus neat PDMC, suggesting that an interfacial phenomenon other than SIAC defects may be responsible.

Permeation testing with a 10% carbon dioxide/90% methane mixture was also performed on the above membranes at pressures up to 700 psia. Average permeabilities and selectivities are compared in FIG. 4. Similar permeability and selectivity trends noted for pure gas testing were also observed in mixed gas testing. All MMM permeabilities were enhanced over neat PDMC; selectivities for MMMs with AR-SSZ-13 were reduced, while those for MMMs with RS-SSZ-13 were enhanced over neat PDMC. The downward trend in permeabilities and selectivities with increasing pressure is due to Langmuir saturation. This phenomenon and its impact on membrane transport properties are described in, for example, Kamaruddin, H. D. and W. J. Koros, Some observations about the application of Fick's first law for membrane separation of multicomponent mixtures. Journal of Membrane Science, 1997. 135(2): p. 147-159 and Koros, W. J., et al., *A model for permeation of mixed gases and vapors in glassy-polymers*. Journal of Polymer Science Part B-Polymer Physics, 1981. 19(10): p. 1513-1530.

Figure 4:
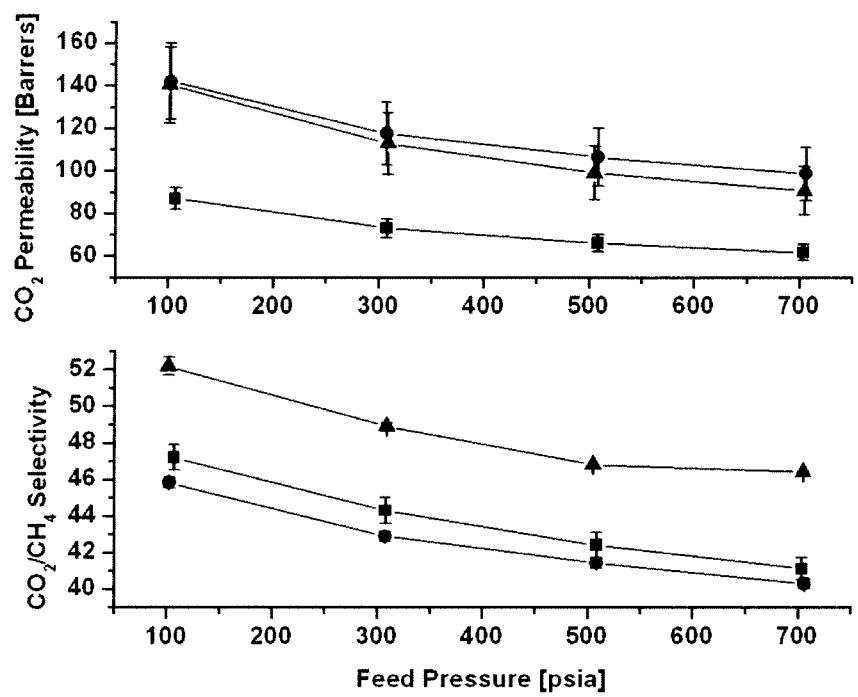
FIG. 4 shows mixed gas permeation results for neat PDMC (■) and 25 wt % as-received (●) and reactively sized (▲) SSZ-13/PDMC MMMs.

FIG. 4 shows mixed gas permeation results for neat PDMC (■) and 25 wt % as-received (●) and reactively sized (▲) SSZ-13/PDMC MMMs. Membranes tested with 10% $CO_2$/90% $CH_4$ at 35° C.; feed pressure is fugacity corrected. The error bars represent±one standard deviation. The analysis shows that permeability and selectivity enhancements over neat PDMC are possible at 700 psia and 35° C. Membranes with 25 wt % as-received SSZ-13 were apparently defective, exhibiting a carbon dioxide permeability enhancement of 60% (from 61.6 to 98.6 Barrers) and a carbon dioxide/methane selectivity reduction of 2% (from 41.1 to 40.3) versus neat PDMC during mixed gas testing at 700 psia. At the same test conditions and sieve loading, membranes with SSZ-13 treated with the aforementioned reactive sizing procedure exhibited a carbon dioxide permeability enhancement of 47% (from 61.6 to 90.6 Barrers) and a carbon dioxide/methane selectivity enhancement of 13% (from 41.1 to 46.4) over neat PDMC.

Interface Region of the MMM

While not wishing to be bound to any particular theory it is believed that a region of polymer surrounding a treated sieve particle, i.e., interface region may have transport properties substantially different from either the bulk polymer or the molecular sieve as opposed to interfacial voids of conventional MMMs. This interphase region may have lower permeability and/or greater selectivity than the bulk polymer (described as matrix rigidification in Moore, T. T. and W. J. Koros, *Non-ideal effects in organic-inorganic materials for gas separation membranes.* Journal of Molecular Structure, 2005. 739(1-3): p. 87-98) or it may have greater permeability and/or lower selectivity (described as a dilated interphase of lower polymer density). The latter is a situation similar to that described in Merkel, T. C., et al., *Ultrapermeable, reverse-selective nanocomposite membranes.* Science, 2002. 296(5567): p. 519-522 where nanoscale, nonporous silica was dispersed throughout a rigid, high $T_g$ polymer. That is, enhanced permeability and reverse-selectivity may be the result of an increase in free volume caused by disruptions in polymer chain packing.

SSZ-13 may be capable of causing localized packing disruption in PDMC. However, as described in Priestley, R. D., et al. *Evidence for the molecular-scale origin of the suppression of physical aging in confined polymer: fluorescence and dielectric spectroscopy studies of polymer-silica nanocomposites.* 2007: Iop Publishing Ltd, a glassy polymer will experience a significant reduction in aging dynamics when adsorbed onto a rigid substrate. This hindered chain mobility can extend over 100 nm from a surface as stated in Priestley, R. D., et al., Structural relaxation of polymer glasses at surfaces, interfaces and in between. Science, 2005. 309(5733): p. 456-459. Physical aging in polymer membranes leads to more consolidated chain packing, which often results in lower permeability and greater selectivity.

If PDMC and SSZ-13 interact favorably, as suggested by FIG. 3, an adsorbed PDMC chain in a solvated, swollen state may not be able to adopt a more equilibrated configuration on the time scale during which these membranes were characterized. This analysis may help explain the lack of transport improvement reported for various MMMs utilizing silane coupling agents to enhance polymer/sieve adhesion, even when adhesion in these membranes was visually improved as described in Mahajan, R. and W. J. Koros, *Mixed matrix membrane materials with glassy polymers. Part 1.* Polymer Engineering and Science, 2002. 42(7): p. 1420-1431 and Duval, J. M., et al., *Preparation of zeolite filled glassy polymer membranes.* Journal of Applied Polymer Science, 1994. 54(4): p. 409-418. Thus, rigid, high $T_g$ polymers, such as PDMC (especially when crosslinked), may form dilated interphases having considerably higher permeability and lower selectivity than the bulk polymer.

Moreover, if the surface-bound material deposited during reactive sizing exists as oligomeric chains extending from the sieve surface, these chains could entangle dilated polymer chains within the interphase. The additional material within the interphase may serve to reduce the local free volume, which would lead to lower permeability and increased selectivity in the interphase. This would, in turn, improve overall MMM transport properties.

Estimation of Interphase Properties

A method to estimate interphase transport properties using the three-phase Maxwell model and experimental MMM permeation data was developed. By simultaneously solving the model as applied to both uncalcined and calcined sieve-containing MMMs, a reasonable estimate of both the interphase thickness and its permeability were determined. Such a solution was feasible by assuming identical calcined and uncalcined sieve dimensions, as well as identical interphase properties in the different membranes. This assumption was valid since calcined and uncalcined sieves were from the same batch and consistent sieve loadings were used when preparing the MMMs. The details of the calculation are as follows:

$$P_{eff} = P_I \left[ \frac{P_d + 2P_I - 2\phi_s(P_I - P_d)}{P_d + 2P_I + \phi_s(P_I - P_d)} \right] \quad (1)$$

where P is permeability and the subscripts I and d refer to the interphase and dispersed phases, respectively. $P_{eff}$ is the effective permeability for the combination of the sieve and interphase. The sieve volume fraction in this two-phase pseudosieve is defined as:

$$\phi_s = \frac{\phi_d}{\phi_d + \phi_I} \quad (2)$$

Equation 1 is then inserted into the Maxwell model again to arrive at the following:

$$P_{3MM} = P_c \left[ \frac{P_{eff} + 2P_c - (\phi_d + \phi_I)(P_c - P_{eff})}{P_{eff} + 2P_c + (\phi_d + \phi_I)(P_c - P_{eff})} \right] \quad (3)$$

$P_d=0$ for a non-porous dispersed phase (such as uncalcined SSZ-13). Under such conditions, Equation 1 reduces to:

$$P_{eff} = P_I \frac{2(1 - \phi_s)}{(2 + \phi_s)} \quad (4)$$

$\Phi_d$ from the sieve loading in a given hybrid membrane is known. Therefore, for a 25% (w/w) uncalcined SSZ-13/PDMC mixed matrix membrane that $\Phi_d$=0.202. Using this value and Equation 2, a series of values for $\Phi_s$ can be generated by varying $\Phi_I$ from 0 to (1-$\Phi_d$).

If $P_{eff}$ in Equation 4 is set to the experimentally determined permeability for a PDMC hybrid membrane containing uncalcined SSZ-13, $P_I$ can be predicted for each of the $\Phi_s$ values generated above. These predictions are made for both carbon dioxide and methane.

The values for $P_I$ (with respective $\Phi_s$ values) determined in the previous step can be used in Equation 1 to predict a series of $P_{eff}$ values for the case of calcined SSZ-13. This is made possible by assuming similar interphase properties for similar volume fractions of uncalcined and calcined SSZ-13 in two separate membranes.

The carbon dioxide and methane $P_{eff}$ values (with respective $\Phi_I$ values) from above are then used in Equation 3 to predict a series of 3MM-predicted permeabilities ($P_{3MM}$).

The $P_{3MM}$ values predicted above are then compared with experimentally measured values for a PDMC hybrid membrane containing calcined SSZ-13. The best match between predicted and measured values ($CO_2$ and $CH_4$) leads to the best estimate of $P_I$. Using the respective value for $\Phi_s$, the interphase thickness, $l_I$, can be estimated from:

$$\phi_s = \frac{\phi_d}{\phi_d + \phi_l} = \frac{r_p^3}{(r_p + l_l)^3} \quad (5)$$

where $r_p$ is the radius of the sieve particles and $l_I$ is the thickness of the interphase.

Using this method, the interphase thickness was estimated to be ~50 nm. The interphase was estimated to have a carbon dioxide permeability of ~540 Barrers and a carbon dioxide/methane selectivity of ~19. These values are reasonable and consistent with the MMM results reported help to understand the observed membrane performance.

What is claimed is:

1. A method for treating molecular sieve particles for use in a mixed matrix membrane for separating carbon dioxide and methane comprising the treated molecular sieve particles dispersed in a crosslinked polymer continuous phase wherein said method comprises:
(a) selecting molecular sieve particles comprised of microporous aluminosilicate suitable for use in a mixed matrix membrane;
(b) polymerizing a polymer which is compatible with a crosslinked polymer to be employed as a continuous phase in the mixed matrix membrane in the presence of the molecular sieve particles to obtain treated molecular sieve particles; and
(c) forming a membrane by dispersing the treated molecular sieve particles in a crosslinked polymer continuous phase wherein the polymer is crosslinked via transesterification, wherein the membrane is characterized by having a carbon dioxide/methane ideal selectivity of at least about 5% higher at 65 psia and 35.degree. C. than a comparable membrane with untreated molecular sieve particles.

2. The method of claim 1 wherein the molecular sieve particles are selected from the group consisting of ABW, AEI, AFT, AFX, APC, APD, ATN, ATT, ATV, AWW, BIK, BRE, CAS, CHA, DDR, EAB, EDI, ERI, GIS, GOO, ITE, JBW, KFI, LEV, LTA, MER, MON, NAT, PAU, PHI, RHO, RTE, RTH, THO, VNI, YUG, ZON, Linde Type A, Chabazite, Erionite, SAPO-56, AEL, AFO, AHT, CGF, DAC, EPI, EUO, FER, HEU, LAU, MEL, MFI, MFS, MTT, NES, PAR, SFF, STF, STI, TER, TON, WEI, WEN, ZSM-5, ZSM-11, ZSM-22, ZSM-23, ZSM-35, ZSM-48, ZSM-57, SUZ-4, SSZ-13, SSZ-23, SSZ-25, SSZ-28, SSZ-32, SSZ-36, NU-87, silicalite, AFI, AFR, AFS, AFY, ATO, ATS, BEA, BOG, BPH, CAN, CON, CZP, DFO, EMT, FAU, GME, LTL, MAZ, MEI, MOR, MTW, OFF, OSI, RON, SAO, VET, Linde Type L, Beta zeolite, CIT-1, Faujasite, Mazzite, Mordenite, ZSM-12, Offretite, CLO, VFI, AET, CFI, Cloverite, CTI-5 and mixtures thereof.

3. The method of claim 1 wherein the molecular sieve particles are SSZ-13.

4. The method of claim 1 wherein the polymer which is compatible with the polymer to be employed in the mixed matrix membrane is substituted or unsubstituted polysulfones, poly(styrenes), styrene-butadiene copolymers, styrene-vinylbenzylhalide copolymers, polycarbonates, cellulosic polymers, polyamides, polyimides, polyethers, polyetherimides, polyetherketones, polyethersulfones, poly(arylene oxides), poly(esteramide-diisocyanate), polyurethanes, polyesters, poly(alkyl methacrylates), poly(acrylates), poly(phenylene terephthalate), polypyrrolones, polysulfides, poly(ethylene), poly(propylene), poly(butene-1), poly(4-methyl pentene-1), polyvinyls, polyallyls, poly(benzobenzimidazole), polyhydrazides, polyoxadiazoles, polytriazoles, poly(benzimidazole), polycarbodiimides, polyphosphazines.

5. The method of claim 1 wherein the polymer which is compatible with the polymer to be employed in the mixed matrix membrane is a polyimide.

6. The method of claim 1 wherein the polymer which is compatible with the polymer to be employed in the mixed matrix membrane is PDMC.

7. The method of claim 1 wherein the molecular sieve particles have an chabazite framework.

8. The method of claim 1 wherein the molecular sieve particles have a silica to alumina molar ratio of greater than about 25.

9. The method of claim 1 wherein the molecular sieve particles have an average particle size of from about 100 to about 700 nm.

10. A mixed matrix membrane for separating carbon dioxide and methane comprising:
(1) a crosslinked polymer continuous phase, wherein the polymer is crosslinked via transesterification; and
(2) treated molecular sieve particles dispersed in said continuous phase; wherein the membrane is characterized by having a carbon dioxide/methane ideal selectivity of at least about 5% higher at 65 psia and 35.degree. C. than a comparable membrane with untreated molecular sieve particles.

11. The mixed matrix membrane of claim 10 wherein the membrane is characterized by having a carbon dioxide/methane ideal selectivity of at least about 7% higher at 65 psia and 35.degree. C. than a comparable membrane with untreated molecular sieve particles.

12. The mixed matrix membrane of claim 10 wherein the membrane is characterized by having a carbon dioxide/methane ideal selectivity of at least about 9% higher at 65 psia and 35.degree. C. than a comparable membrane with untreated molecular sieve particles.

13. The mixed matrix membrane of claim 10 wherein the molecular sieve particles are selected from the group consisting of ABW, AEI, AFT, AFX, APC, APD, ATN, ATT, ATV, AWW, BIK, BRE, CAS, CHA, DDR, EAB, EDI, ERI, GIS, GOO, ITE, JBW, KFI, LEV, LTA, MER, MON, NAT, PAU, PHI, RHO, RTE, RTH, THO, VNI, YUG, ZON, Linde Type A, Chabazite, Erionite, SAPO-56, AEL, AFO, AHT, CGF, DAC, EPI, EUO, FER, HEU, LAU, MEL, MFI, MFS, MTT, NES, PAR, SFF, STF, STI, TER, TON, WEI, WEN, ZSM-5, ZSM-11, ZSM-22, ZSM-23, ZSM-35, ZSM-48, ZSM-57, SUZ-4, SSZ-13, SSZ-23, SSZ-25, SSZ-28, SSZ-32, SSZ-36, NU-87, silicalite, AFI, AFR, AFS, AFY, ATO, ATS, BEA, BOG, BPH, CAN, CON, CZP, DFO, EMT, FAU, GME, LTL, MAZ, MEI, MOR, MTW, OFF, OSI, RON, SAO, VET, Linde Type L, Beta zeolite, CIT-1, Faujasite, Mazzite, Mordenite, ZSM-12, Offretite, CLO, VFI, AET, CFI, Cloverite, CTI-5 and mixtures thereof.

14. The mixed matrix membrane of claim 10 wherein the crosslinked polymer continuous phase is substituted or unsubstituted polysulfones, poly(styrenes), styrene-butadiene copolymers, styrene-vinylbenzylhalide copolymers, polycarbonates, cellulosic polymers, polyamides, polyimides, polyethers, polyetherimides, polyetherketones, polyethersulfones, poly(arylene oxides), poly(esteramide-diisocyanate), polyurethanes, polyesters, poly(alkyl methacrylates), poly(acrylates), poly(phenylene terephthalate), polypyrrolones, polysulfides, poly(ethylene), poly(propylene), poly(butene-1), poly(4-methyl pentene-1), polyvinyls, polyallyls, poly(benzobenzimidazole), polyhydrazides, polyoxadiazoles, polytriazoles, poly(benzimidazole), polycarbodiimides, polyphosphazines.

15. The mixed matrix membrane of claim 10 wherein the crosslinked polymer continuous phase is a polyimide.

16. The mixed matrix membrane of claim 10 wherein the crosslinked polymer continuous phase is PDMC.

17. The mixed matrix membrane of claim 10 wherein the crosslinked polymer continuous phase is PDMC and the treated molecular sieve particles are microporous aluminosilicate particles.

18. The mixed matrix membrane of claim 17 wherein the treated molecular sieve particles were treated by a method which comprises: (a) selecting molecular sieve particles suitable for use in a mixed matrix membrane; and (b) polymerizing a polymer which is compatible with the polymer to be employed in the mixed matrix membrane in the presence of the molecular sieve particles to obtain treated molecular sieve particles.

19. The mixed matrix membrane of claim 18 wherein the polymer which is compatible with the polymer to be employed in the mixed matrix membrane is PDMC.

* * * * *